United States Patent
Umetani

(10) Patent No.: US 8,593,836 B2
(45) Date of Patent: Nov. 26, 2013

(54) POWER CONVERTER USING SOFT SWITCHING METHOD FOR ZERO CURRENT SWITCHING AT TURN ON AND ZERO VOLTAGE SWITCHING AT TURN OFF

(75) Inventor: Kazuhiro Umetani, Kariya (JP)

(73) Assignee: Denso Corporation, Kariya (JP)

( * ) Notice: Subject to any disclaimer, the term of this patent is extended or adjusted under 35 U.S.C. 154(b) by 173 days.

(21) Appl. No.: 13/276,432

(22) Filed: Oct. 19, 2011

(65) Prior Publication Data

US 2012/0099348 A1    Apr. 26, 2012

(30) Foreign Application Priority Data

Oct. 20, 2010  (JP) ................................. 2010-235740
Jul. 12, 2011  (JP) ................................. 2011-153479

(51) Int. Cl.
*H02M 3/335* (2006.01)
*H02M 3/24* (2006.01)
*H02M 7/44* (2006.01)

(52) U.S. Cl.
USPC .................. 363/25; 363/24; 363/26; 363/95; 363/97; 363/131

(58) Field of Classification Search
USPC ............................. 363/24, 25, 26, 95, 97, 131
See application file for complete search history.

(56) References Cited

U.S. PATENT DOCUMENTS

| | | | | |
|---|---|---|---|---|
| 5,872,705 A * | 2/1999 | Loftus et al. | ................ | 363/21.06 |
| 6,295,213 B1 * | 9/2001 | Smith | ........................ | 363/21.01 |
| 6,639,814 B2 * | 10/2003 | Gan et al. | ........................ | 363/25 |
| 6,906,930 B2 * | 6/2005 | Jang et al. | ........................ | 363/17 |
| 6,987,675 B2 * | 1/2006 | Jovanovic et al. | ......... | 363/21.01 |
| 7,791,904 B2 * | 9/2010 | Zhang et al. | .................... | 363/17 |
| 7,995,360 B2 * | 8/2011 | Mayell | ........................ | 363/21.12 |
| 2009/0046485 A1 * | 2/2009 | Wei et al. | ........................ | 363/26 |
| 2010/0039837 A1 * | 2/2010 | Mayell | ............................ | 363/25 |
| 2010/0073968 A1 * | 3/2010 | Mayell | ............................ | 363/25 |

FOREIGN PATENT DOCUMENTS

| | | |
|---|---|---|
| JP | 5-328714 | 12/1993 |
| JP | 2001-178116 | 6/2001 |
| JP | 2001-309646 | 11/2001 |
| JP | 2009-027764 | 2/2009 |
| JP | 2011-087418 | 4/2011 |

OTHER PUBLICATIONS

Office Action (2 pages) dated Jun. 18, 2013, issued in corresponding Japanese Application No. 2011-153479 and English translation (3 pages).

* cited by examiner

*Primary Examiner* — Bao Q Vu
(74) *Attorney, Agent, or Firm* — Nixon & Vanderhye P.C.

(57) ABSTRACT

A power converter includes a main switch to which a capacitor is connected through a sub-diode. A series connection of a primary coil of a transformer and a sub-switch is connected parallel to the capacitor. A main diode is coupled in series with the main switch. A series connection of a sub-diode and a secondary coil of the transformer is parallel to the main diode. The rate of a rise in voltage across the main switch when turned off is suppressed by the rate of charging of the capacitor. Subsequently, by turning on the sub-switch, the current flowing through the main diode to be delivered to the transformer, thereby causing the current flowing through the main switch when turned on to be decreased by the sub-inductor.

9 Claims, 15 Drawing Sheets

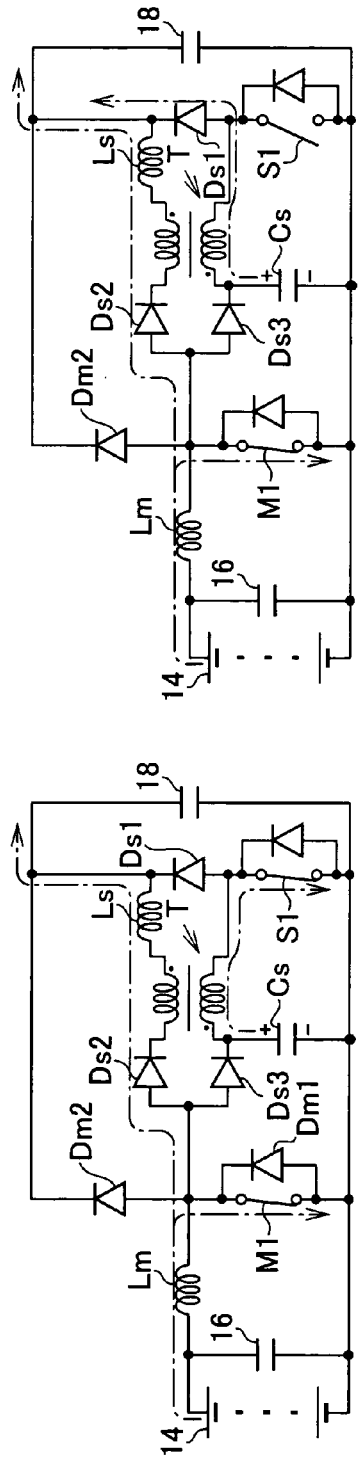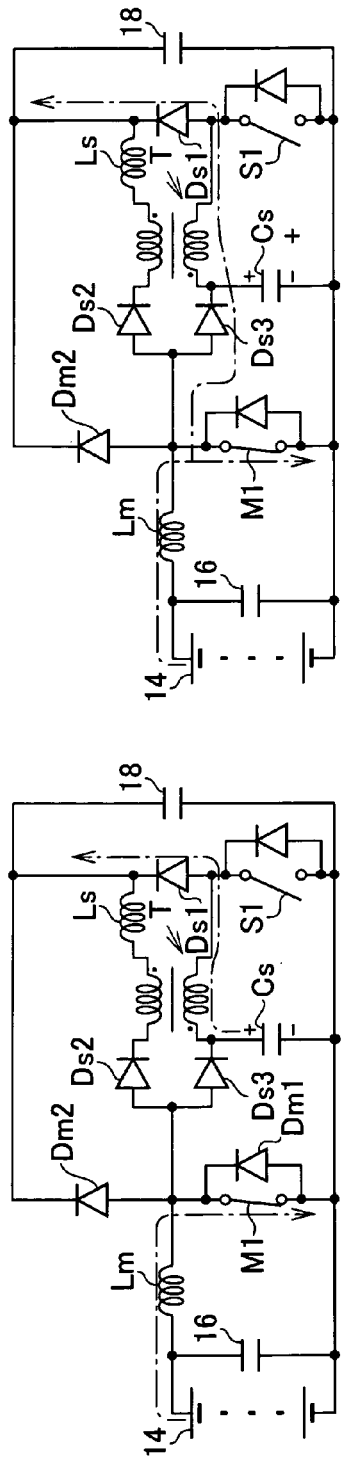
FIG.4(a)  FIG.4(b)  FIG.4(c)  FIG.4(d)

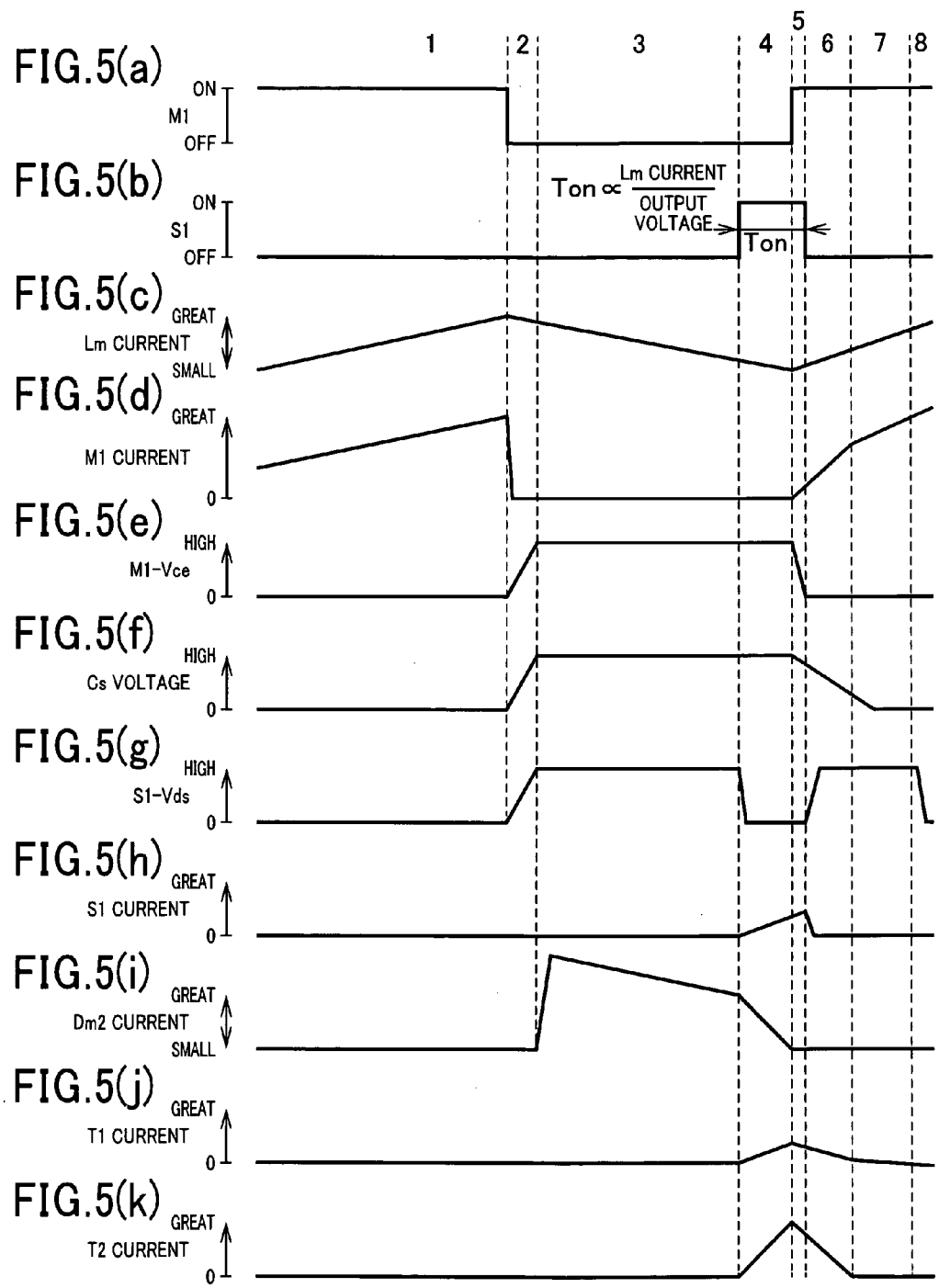

FIG.7(a) M1 ON/OFF
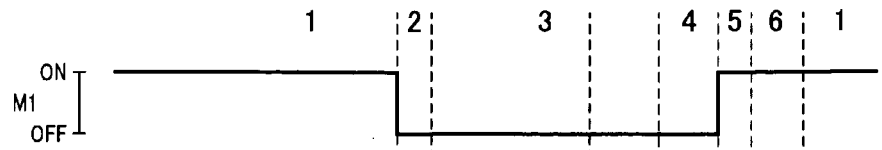
FIG.7(b) S1 ON/OFF
FIG.7(c) Lm CURRENT
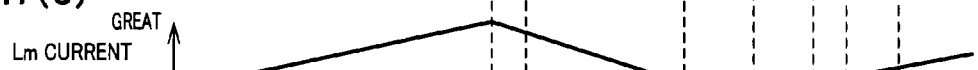
FIG.7(d) M1 CURRENT
FIG.7(e) M1-Vce
FIG.7(f) Cs VOLTAGE
FIG.7(g) S1-Vds
FIG.7(h) S1 CURRENT
FIG.7(i) Dm2 CURRENT
FIG.7(j) T1 CURRENT
FIG.7(k) T2 CURRENT

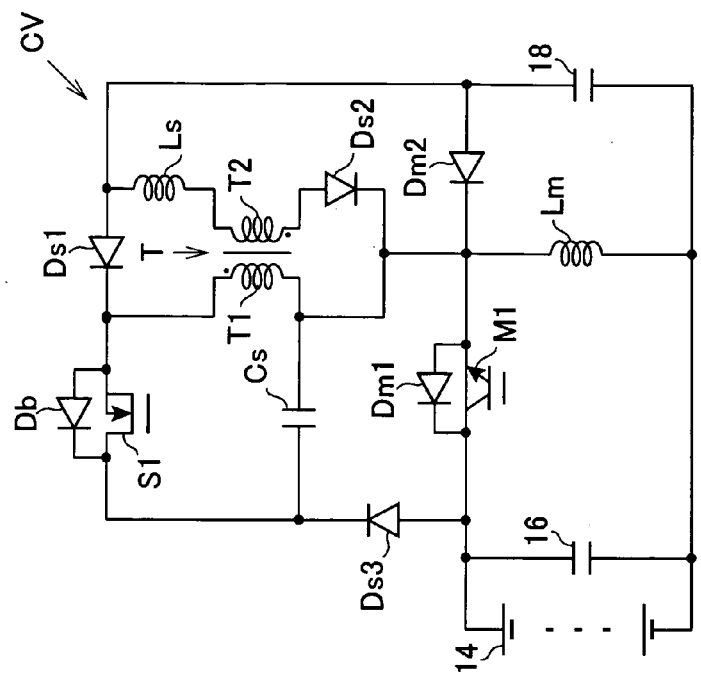
FIG.15(c)
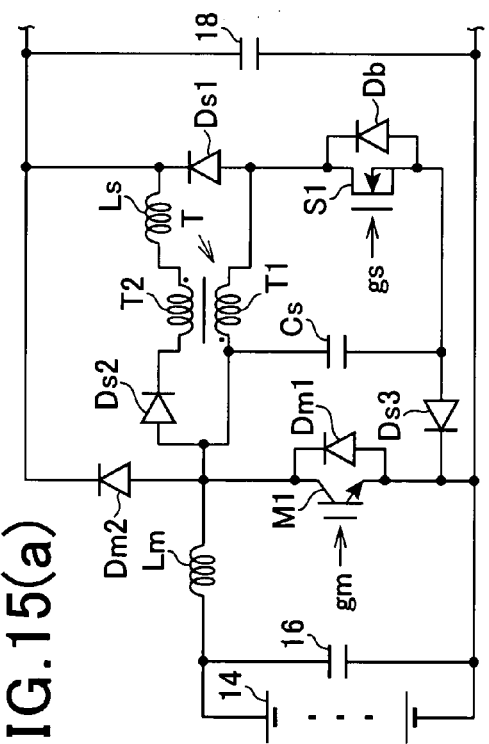
FIG.15(a)
FIG.15(b)

POWER CONVERTER USING SOFT SWITCHING METHOD FOR ZERO CURRENT SWITCHING AT TURN ON AND ZERO VOLTAGE SWITCHING AT TURN OFF

The present application claims the benefit of priority of Japanese Patent Application No. 2010-235740 filed on Oct. 20, 2010, and Japanese Patent Application No. 2011-153479 filed on Jul. 12, 2011, disclosures of which are incorporated herein by reference.

BACKGROUND OF THE INVENTION

1. Technical Field

The present invention relates generally to a power converter apparatus equipped with a series-connected assembly of a first current flow controlling component which has an open/close function to open or close a current flow path and a second current flow controlling component which has at least one of the open/close function and a rectifying function to permit a flow of current only in one direction, and an inductor coupled to a joint of the first and second current flow controlling components.

2. Background Art

Power converters which are equipped with magnetic parts and serve as a power supply have been required to be reduced in size upon recent request to downsize electronic equipment. Usually, the magnetic parts that are passive components occupy a considerable part of the size of the power converter. The downsizing of the power converter, therefore, requires the reduction in size of the passive components. This requires the need for increasing the switching frequency in the power converter, but results in an increase in switching loss, which leads to a decrease in efficiency in operation of the power converter. The switching loss is generally quantified by a time integral of a product of a potential difference between ends of a current path in which a switching device is disposed and an electric current flowing through the current path upon an on/off operation of the switching device.

In order to decrease the switching loss, Japanese Patent First Publication No. 2001-178116 teaches use of a series-connected assembly of a diode and a snubber capacitor which are coupled together in series and also in parallel to a switching device in a step-up chopper circuit. Specifically, the voltage developed across the switching device when turned off is restricted by a change in voltage charged in the snubber capacitor, which will lead to decrease the switching loss.

The above prior art system, however, has the problem that it is impossible to decrease the switching loss when the switching device is turned on.

SUMMARY

It is therefore an object to provide a power converter apparatus which is designed to decrease the switching loss of a current flow controlling component which has an open/close function when the current flow controlling component operates either to open or close a current flow path.

According to one aspect of an embodiment, there is provided a power converter apparatus which may be employed for transmission of electric power between a battery and an electric motor. The power converter apparatus comprises: (a) a converter circuit with a high-potential terminal and a low-potential terminal; (b) a first current flow controlling component which performs an open/close function to selectively open and close a current flow path of the converter circuit; (c) a second current flow controlling component which is connected in series with the first current flow controlling component as a series-connected assembly, the second current flow controlling component performing one of an open/close function and a rectifying function, the open /close function being to selectively open and close the current flow path, the rectifying function being to permit an electrical current to flow in only one direction; (d) a power conversion inductor connected to a joint of the first current flow controlling component and the second current flow controlling component; (e) a capacitor connected in parallel to the first current flow controlling component; (f) a transformer equipped with a primary coil and a secondary coil, the secondary coil being connected at a first end thereof to the power conversion inductor and in parallel to the second current flow controlling component; (g) a sub-switch connected in series with the primary coil and the series connection of the sub-switch and the primary coil being connected in parallel to the capacitor; (h) a first sub-current flow controlling component disposed in a first path of the converter circuit extending between a first end of the sub-switch through which the sub-switch is connected to the primary coil and a second end of the secondary coil which is opposed to the first end of the secondary coil, the first sub-current flow controlling component working to allow electric current to pass only from a low-potential side to a high-potential side in the first path; (i) a second sub-current flow controlling component working to allow electric current to pass only from a low-potential side to a high-potential side in a second path of the converter circuit which has the secondary coil disposed therein and bypasses the second current flow controlling component; and (j) a third sub-current flow controlling component working to allow electric current to flow in a third path of the converter circuit which extends between the power conversion inductor and the capacitor only in a direction in which, when the first current flow controlling component is opened, electric current will flow in the third path.

A change in voltage across the first current flow controlling component when being opened is suppressed by a change in voltage at the capacitor, thus minimizing the switching loss. The electric current which flows through the second current flow controlling component upon opening of the first current flow controlling component starts to pass through the primary coil and the secondary coil of the transformer upon turning on of the sub-switch. The increase of current flowing through the first current flow controlling component when closed is, therefore, suppressed by the transformer, thus reducing the power loss upon the closing of the first current flow controlling component. Further, the energy stored in the capacitor is substantially discharged without any loss.

In the preferred mode of the embodiment, the capacitor is designed to have a variable capacitance.

The delivery of current to the second current flow controlling component upon opening of the first current flow controlling component requires elevation of voltage across the first current flow controlling component up to that across the series-connected assembly. The voltage across the first current flow controlling component, however, depends upon the voltage at the capacitor. Thus, when the current flowing through the inductor is small, it results in a decrease in rate at which the voltage charged in the capacitor rises, which may lead to an increase in time required to lead the current to the second current flow controlling component or a failure in elevating the voltage across the first current flow controlling component up to that across the series-connected assembly. A decrease in capacitance of the capacitor results in an excessive increase in rate at which the voltage charged in the capacitor changes when the current flowing through the inductor is great, thus leading to an increase in rate at which the voltage developed across the first current flow controlling component rises when the first current flow controlling component is opened. This results in deterioration in reducing the switching loss.

In order to alleviate the above problem, the power converter apparatus is designed to change the capacitance of the capacitor as a function of current flowing through the inductor.

The second path of the converter circuit may have a sub-inductor disposed therein. Even when the transformer is engineered ideally, the rate at which the current flowing through the first current flow controlling component increases when the first current flow controlling component is closed is suppressed by the sub-inductor that is a magnetic component.

The sub-inductor and the secondary coil may be at least partially made of a common winding. This permits the transformer and the sub-inductor to be reduced in size.

The transformer may include a core shaped to have a first magnetic loop path in which a magnetic flux interlinks with both the primary coil and the secondary coil, a second magnetic loop path in which a magnetic flux interlinks only with the primary coil, and a third magnetic loop path in which a magnetic flux interlinks only with the secondary coil. This structure creates a leakage flux which functions as the sub-inductor in an equivalent circuit.

The power converter apparatus further includes a controller which turns on the sub-switch when the first current flow controlling component is opened. When the sub-switch is turned on, the current which is to flow through the power conversion inductor will be delivered to the sub-switch through the primary coil and then to secondary coil. The current enters the first current flow controlling component when closed is, therefore, controlled by the current flowing through the transformer.

An on-time for which the sub-switch is kept on is increased with an increase in value derived by dividing an amount of current flowing through the power conversion inductor by a voltage, as developed across the series-connected assembly of the first current flow controlling component and the second current flow controlling component. The amount of current rapidly entering the first current flow controlling component when closed is proportional to that not bypassing the second current flow controlling component. A decrease in such amount of current is preferably achieved by increasing the amount of current bypassing the second current flow controlling component when the current flowing through the power conversion inductor is great. The bypassing amount of current is proportional to a product of the on-time of the sub-switch and the voltage across the series-connected assembly. Based on this fact, the power converter apparatus increases the on-time of the sub-switch as the value derived by dividing the amount of current flowing through the power conversion inductor by the voltage across the series-connected assembly increases, thereby controlling the amount of current not bypassing the second current flow controlling component regardless of the amount of current flowing through the power conversion inductor.

When the second sub-current flow controlling component is a diode, the power converter apparatus may also include a circulating path which provides an alternative path to the second path of the converter circuit except the second sub-current flow controlling component and has disposed therein a rectifier working to allow electric current to pass only from a low-potential side to a high-potential side in the circulating path.

When the current passing through the diode in the forward direction becomes zero, it will cause the recover current to flow through the diode. The flow of the recovery current may cause the energy stored in the second path to appear as a surge voltage when the recovery current decreases. Based on this fact, the rectifier is provided to allow the current to pass which rises from the surge voltage, thereby suppressing the surge voltage.

The circulating path may also have disposed therein a Zener diode whose forward direction is a direction in which electric current flows from the high-potential side to the low-potential side. This avoids the flow of current through the circulating path which arises from the voltage induced at the secondary coil as a function of that applied to the primary coil during a period of time when the current passing through the power conversion inductor becomes zero temporarily.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIGS. 4(a) to 4(d) are circuit diagrams which demonstrate connections of switching devices of the power converter of FIG. 1 to establish fifth to eighth operating states thereof;

FIGS. 5(a) to 5(k) are time charts which demonstrate operations of, currents flowing through, and voltages at parts of the power converter of FIG. 1;

FIGS. 7(a) to 7(k) are time charts which demonstrate operations of, currents flowing through, and voltages at parts of the power converter of FIG. 1 in the operating states of FIGS. 6(a) to 6(d);

FIGS. 15(a), 15(b), and 15(c) are circuit diagrams which illustrate modifications of a power converter.

DESCRIPTION OF THE PREFERRED EMBODIMENTS

Figure 1:
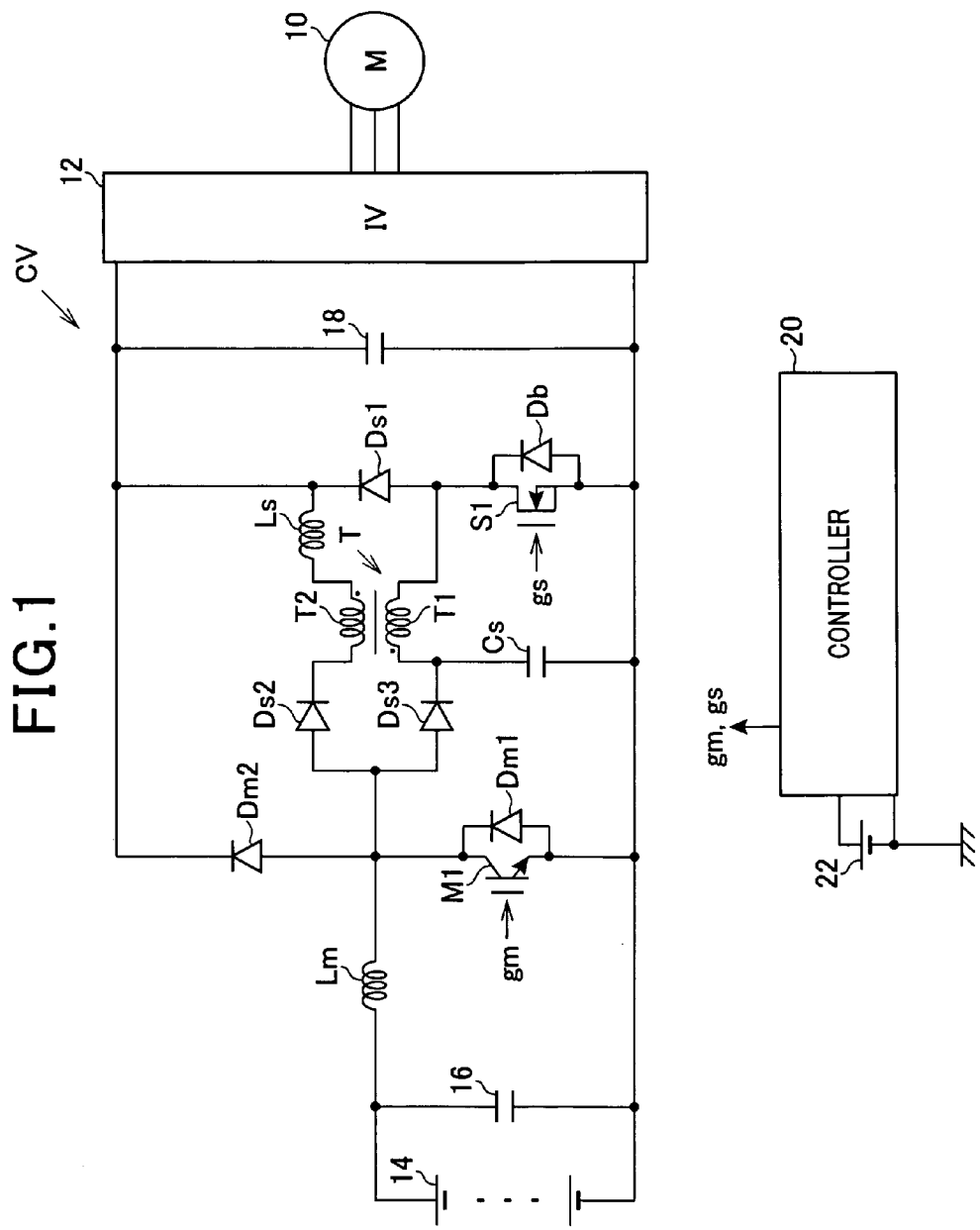
FIG. 1 is a circuit diagram which illustrates a converter control system for a power converter according to the first embodiment of the invention.

Referring to the drawings, wherein like reference numbers refer to like parts in several views, particularly to FIG. 1, there is shown a converter control system designed to control an operation of a power converter CV according to the first embodiment which is used in driving a main engine mounted in an automotive vehicle.

An electric motor-generator 10 is used as the main engine of the vehicle and has an output shaft connected mechanically to driven wheels (not shown) of the vehicle. The motor-generator 10 is joined electrically to a high-voltage battery 14 and a smoothing capacitor 16 through an inverter 12 and the converter CV. The converter CV is equipped with a sub-circuit to reduce the switching loss in a chopper circuit. Specifically, the converter CV includes a main circuit equipped with a main switch M1, a main diode Dm1 connected in inverse-parallel to the main switch M1, and a main diode Dm2 connected in series with the main switch M1 and the main diode Dm1. The converter CV also includes a main inductor Lm and a capacitor 18. The main inductor Lm is connected between a joint of a series-connected assembly of the main diodes Dm1 and Dm2 and a positive pole or terminal of the high-voltage battery 14. The capacitor 18 is coupled in parallel to the series-connected assembly. The main switch M1 is implemented in this embodiment by an insulated gate bipolar transistor (IGBT). The sub-circuit of the converter CV has the following structure.

A series-connected assembly of a sub-diode Ds3 and a capacitor Cs is coupled in parallel to the main switch M1. A series-connected assembly of a primary coil T1 of a transformer T and a sub-switch S1 is connected to the capacitor Cs. The sub-switch S1 is implemented by a MOS field-effect transistor and has a diode Db connected in inverse-parallel thereto as a parasite diode.

To the main diode Dm2, a sub-diode Ds2, a secondary coil T2 of the transformer T, and a sub-inductor Ls are coupled in parallel. A diode Ds1 is connected between the primary coil T1 of the transformer T and the sub-inductor Ls.

Figure 2:
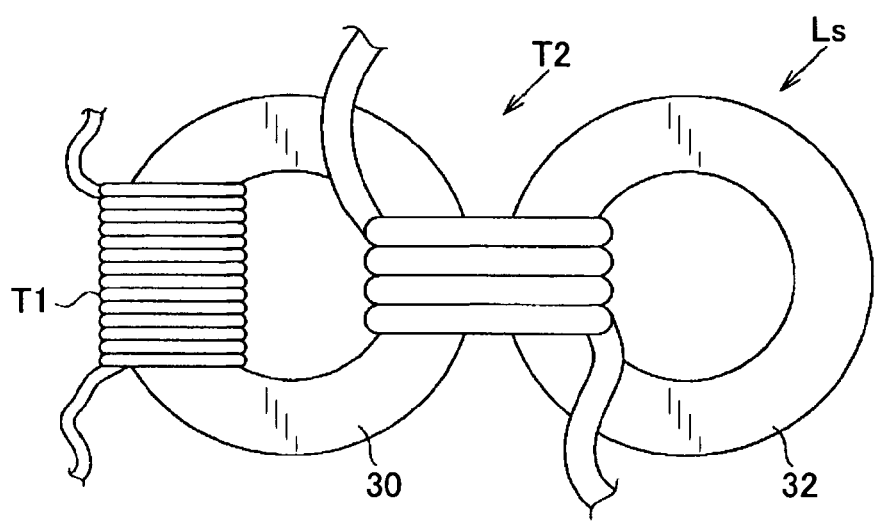
FIG. 2 is a plane view which shows a layout of windings of a transformer and an inductor.

The secondary coil T2 of the transformer T and the sub-inductor Ls are, as illustrated in FIG. 2, implemented by the same winding. Specifically, a single wire is wrapped simultaneously around a core 30 of the transformer T and a core 32 of the sub-inductor Ls. The number of turns of the primary coil T1 of the transformer T is much greater than that of the secondary coil T2. The secondary coil T2 and the sub-inductor Ls may alternatively be partially made of a common winding. For instance, a single wire is first wrapped around only the core 30 several times and then wrapped around both the cores 30 and 32 several times to make the secondary coil T2 and the sub-inductor Ls which are different in number of turns from each other.

The converter control system also includes a controller 30 which is powered by a low-voltage battery 22 whose terminal voltage is, for example, several volts to dozen volts which is lower than that of the high-voltage battery 14 (e.g., more than one hundred volts). The controller 30 outputs operation signals gm and gs to the main switch M1 and the sub-switch S1 to control an output voltage of the converter CV. The operations of the converter CV controlled by the controller 20 will be described below.

FIGS. 3(a) to 3(d) and FIGS. 4(a) to (d) demonstrate operating states of the converter CV, as established when the current flowing through the main inductor Lm does not continue to be zero.

Figure 3A:
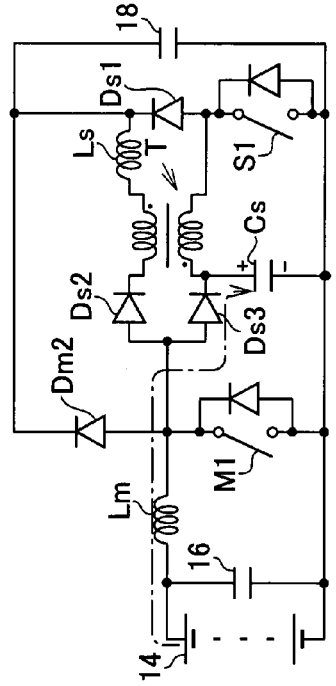
FIGS. 3(a) to 3(d) are circuit diagrams which demonstrate connections of switching devices of the power converter of FIG. 1 to establish first to fourth operating states thereof.

$1^{st}$ Operating State in FIG. 3(a)

The main switch M1 is turned on, so that the current flows from the high-voltage battery 14 to the main switch M1 through the main inductor Lm. The magnetic energy is, therefore, stored in the main inductor Lm.

Figure 3B:
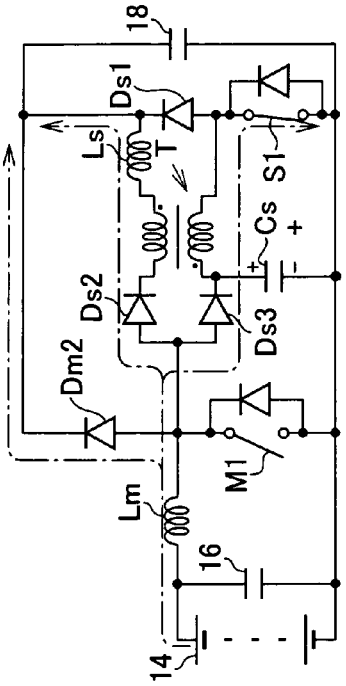

$2^{nd}$ Operating State in FIG. 3(b)

The main switch M1 is turned off. The current flows from the high-voltage battery 14 to the capacitor Cs through the inductor Lm and the sub-diode Ds3. The voltage, as developed between terminals (I.e., the collector and the emitter) of the main switch M1, is restricted by the rate at which the voltage charged in the capacitor Cs rises, thereby resulting in a decrease in power loss upon turning off of the main switch M1.

Figure 3C:
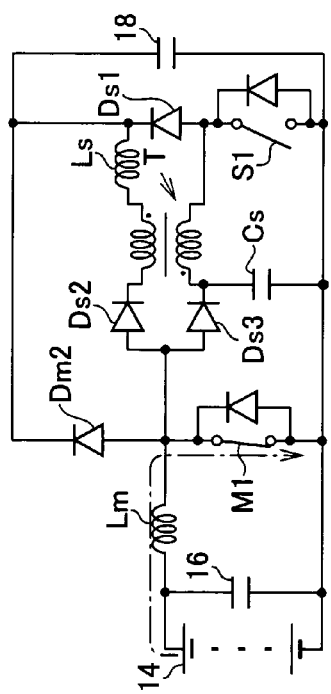

$3^{rd}$ Operating State in FIG. 3(c)

The voltage charged in the capacitor Cs is elevated up to an output voltage of the converter CV (i.e., the voltage at the capacitor 18), so that the current, as outputted from the main inductor Lm, is delivered to the capacitor 18 through the main diode Dm2.

Figure 3D:
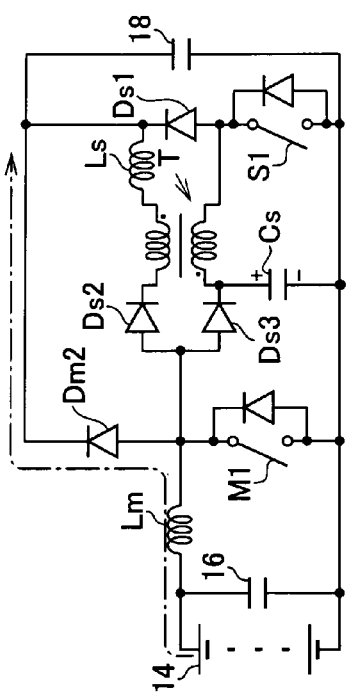

$4^{th}$ Operating State in FIG. 3(d)

Prior to turning on of the main switch M1, the sub-switch S1 is turned on to lead the current, as having been flowing through the main diode Dm2, to the secondary coil T2 of the transformer T, thereby decreasing the current flowing through the main diode Dm2 gradually, while gradually increasing the current which flows through the secondary coil T2. Specifically, when the sub-switch S1 is turned on, it will cause a portion of the current flowing through the main inductor Lm to be delivered to the sub-switch S1 through the sub-diode Ds3 and the primary coil T1. The fourth operating state is so established that the application of voltage to the primary coil T1 with a positive potential at the end of the primary coil T1 close to the sub-diode Ds3, as illustrated in FIG. 3(d), causes the positive potential to be induced at the end of the secondary coil T2 close to the sub-inductor Ls. Thus, when the current flows through the primary coil T1 of the transformer T, it will cause the current to also flow through the secondary coil T2. Since the number of turns of the primary coil T1 is greater than that of the secondary coil T2, the current which is much greater than that flowing through the sub-switch S1 flows through the secondary coil T2. The magnetic energy is then stored in the transformer T and the sub-inductor Ls.

$5^{th}$ Operating State in FIG. 4(a)

After the current flowing through the diode Dm2 becomes almost zero, the main switch M1 is turned on. The turning on of the main switch M1 causes the current flowing through the main switch M1 to increase gradually as the current flowing through the sub-inductor Ls decreases gradually. The rate at which the current flowing through the main switch Ml increases is restricted as a function of the inductance of the sub-inductor Ls. This results in a decrease in power loss upon turning on of the main switch Ml. The turning on of the main switch M1 causes the potential at the joint of the main switch M1 and the main diode Dm2 to drop to that at the negative terminal of the high-voltage battery 14. The capacitor Cs is, thus, discharged, so that the current is delivered from the capacitor Cs to the sub-switch S1.

The sub-inductor Ls, as described above, functions to control or restrict the rate at which the amount of current flowing through the main switch M1 increases gradually. In the absence of the sub-inductor Ls, the transformer T needs to be designed non-ideally to permit the magnetic flux to leak therefrom. This is because in an ideal transformer, a relation in voltage between the primary coil T1 and the secondary coil T2 depends upon a ratio of number of turns between them, thus making it impossible to elevate the voltage at the secondary coil T2 up to the output voltage of the converter CV, which leads to a difficulty in leading the current through the secondary coil T2 when the main switch M1 is turned on.

6th Operating State in FIG. 4(b)

The sub-switch S1 is placed in the off state. The magnetic energy stored in the transformer T is, thus, discharged through the sub-diode Ds1, so that the capacitor Cs continues to discharge.

7th Operating State in FIG. 4(c)

The current flowing through the inductor Lm passes through the main switch M1 fully.

8th Operating State in FIG. 4(d)

The capacitor Cs has been discharged completely, but the magnetic energy is still accumulated, so that the current flowing through the main inductor Lm partially enters the transformer T. When the magnetic energy in the transformer T becomes zero, the current will flow from the main inductor Lm to the main switch M1 fully, so that the first operating state is entered.

The energy discharged from the capacitor Cs in each of the fifth to seventh operating states is transferred to an output of the converter CV without any loss and then used to drive the motor-generator 10.

FIGS. 5(a) to 5(k) are time charts which demonstrate the operations of the converter CV. Specifically, FIG. 5(a) represents a change in operating state of the main switch M1. FIG. 5(b) represents a change in operating state of the sub-switch S1. FIG. 5(c) represents a change in current flowing through the main inductor Lm. FIG. 5(d) represents a change in current flowing through the main switch M1. FIG. 5(e) represents a change in voltage appearing across ends of the main switch M1 (i.e., the collector and the emitter of the main switch M1). FIG. 5(f) represents a change in voltage developed across the capacitor Cs. FIG. 5(g) represents a change in voltage appearing across ends of the sub-switch S1. FIG. 5(h) represents a change in current flowing through the sub-switch S1. FIG. 5(i) represents a change in current flowing through the main diode Dm2. FIG. 5(j) represents a change in current flowing through the primary coil T1 of the transformer T. FIG. 5(k) represents a change in current flowing through the secondary coil T2 of the transformer T.

The on-time Ton for which the sub-switch S1 is turned on is increased proportional to the value derived by dividing the amount of current flowing through the main inductor Lm by the output voltage of the converter CV(i.e., the voltage developed across the ends of the capacitor 18, in other words, voltage appearing across the series-connected assembly of the main switch M1 and the main diode Dm2). This is made for minimizing the current flowing through the main diode Dm2 when the main switch M1 is turned on. Specifically, of the current flowing through the main inductor Lm, the amount of a portion which is to be outputted through the transformer T without passing through the main diode Dm2 becomes great as the product of the on-time Ton of the sub-switch S1 and the output voltage of the converter CV increases. Therefore, the controller 20 increases the on-time Ton of the sub-switch S1 as an increase in value derived by dividing the amount of current flowing through the main inductor Lm by the output voltage of the converter CV to decrease the current flowing through the main diode Dm2 upon turning on of the main switch M1. Note that FIGS. 5(a) to 5(k) illustrate the case where the sub-switch S1 is turned off after the main switch M1 is turned on, but however, such a switching sequence may alternatively be reversed.

The operating states of the converter CV when the current flowing through the main inductor Lm remains zero for a finite length of time will be described below with reference to FIGS. 6(a) to 6(d).

Figure 6A:
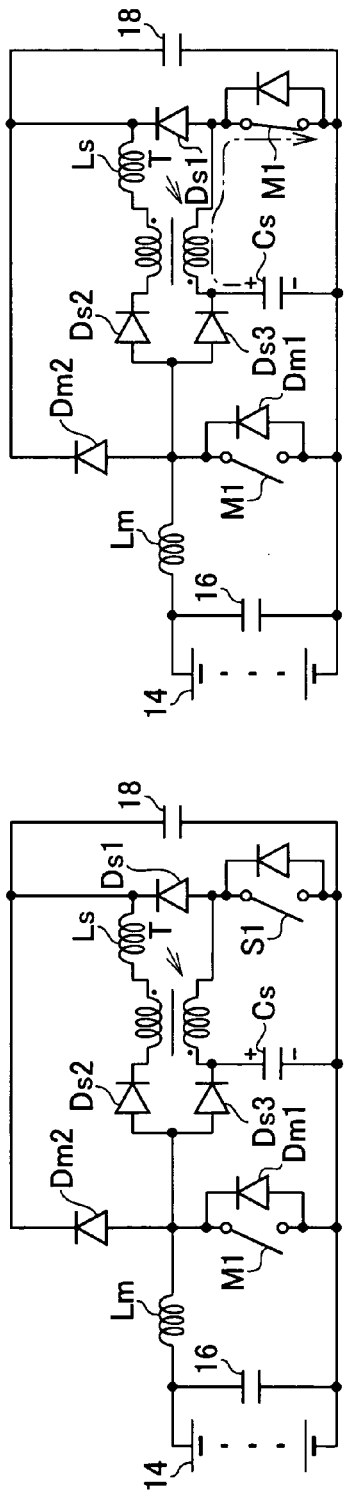
FIGS. 6(a) to 6(d) are circuit diagrams which demonstrate connections of switching devices of the power converter of FIG. 1 to establish third to sixth operating states thereof when the current flowing through a main inductor Lm remains zero for a finite length of time.

3rd Operating State in FIG. 6(a)

The operating state of the converter CV, as illustrated in FIG. 6(a), is the third operating state in the condition where the current flowing through the main inductor Lm is zero.

Figure 6B:
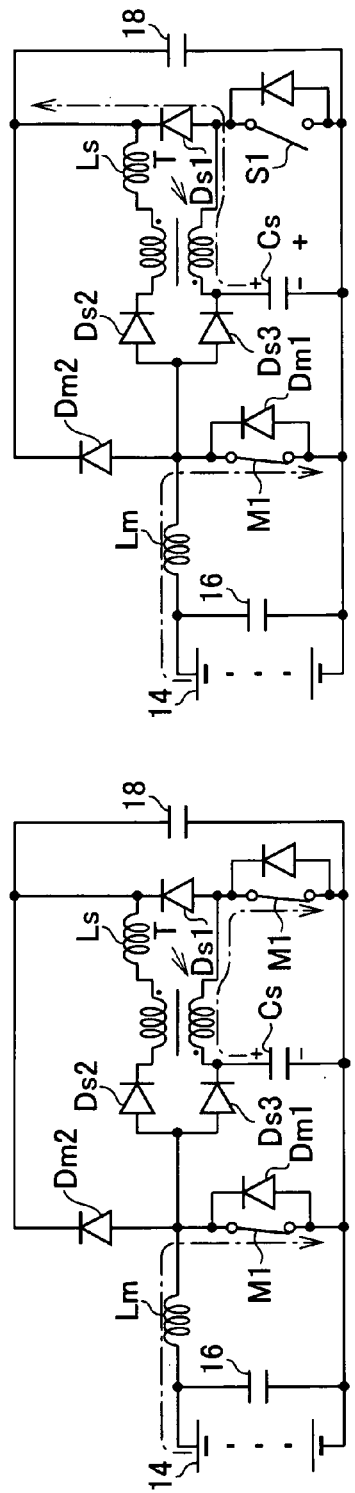

4th Operating State in FIG. 6(b)

The sub-switch S1 is turned on. This causes the energy to be discharged from the capacitor Cs through the primary coil T1 of the transformer T and the sub-switch S1. At this time, no current flows through the secondary coil T2 of the transformer T. This is because the number of turns of the secondary coil T2 is smaller than that of the primary coil T1, so that the voltage induced at the secondary coil T2 will be lower than the output voltage of the converter CV. The primary coil T1, thus, functions as a reactor to store the energy discharged from the capacitor Cs as the magnetic energy.

Figure 6C:
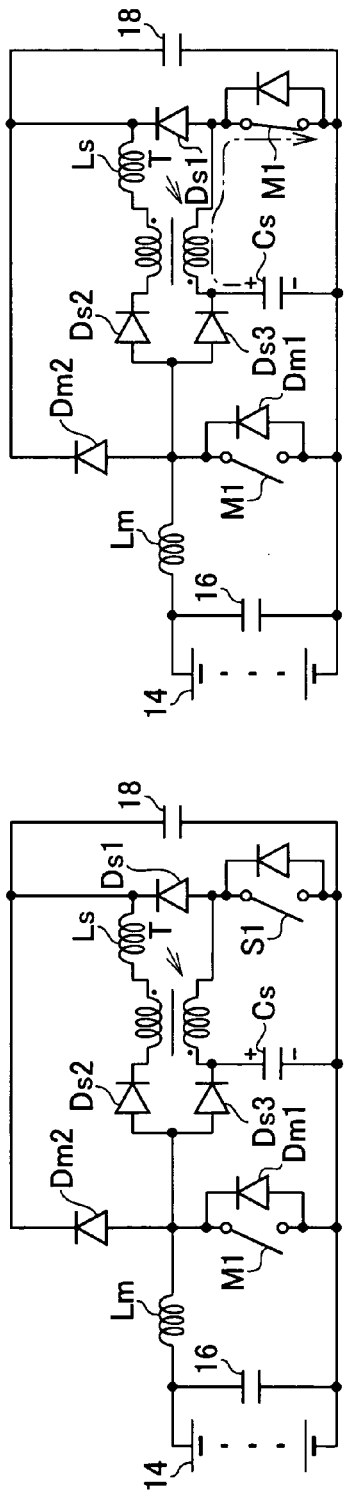

5th Operating State in FIG. 6(c)

The main switch M1 is turned on. The rate at which the current flowing through the main switch M1 increases is restricted by the inductance of the main inductor Lm, thus resulting in zero-current switching (ZCS) in the main switch M1 when turned on, which leads to a decrease in power loss.

Figure 6D:
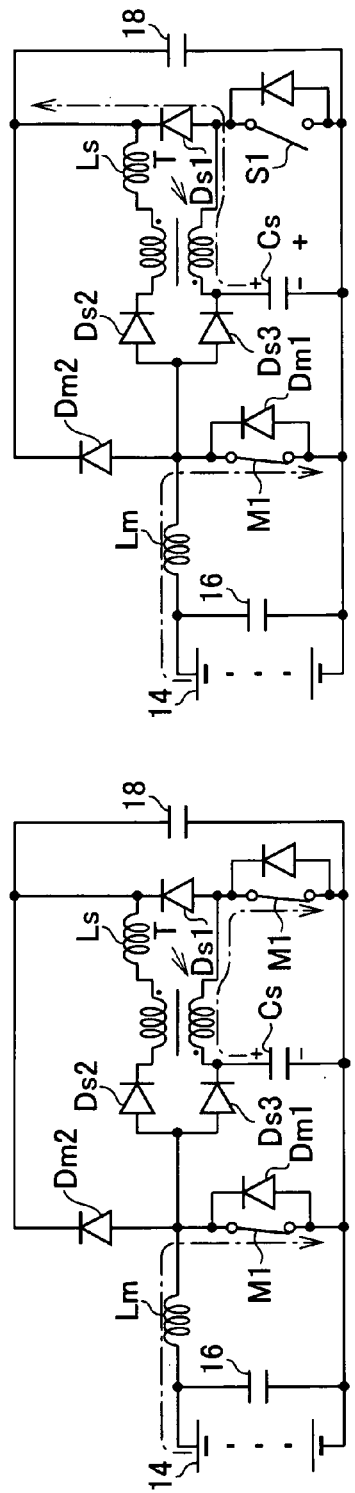

6th Operating State in FIG. 6(d)

The sub-switch S1 is turned off. This causes the magnetic energy stored in the transformer T along with the energy stored in the capacitor Cs, to be transferred to the output terminal of the converter CV through the primary coil T1 and the sub-diode Ds1. The energy stored in the capacitor Cs and the transformer T is, thus, used as the output energy without any loss. When the voltage across the capacitor Cs becomes zero, the first operating state is entered.

FIGS. 7(a) to 7(k) are time charts which demonstrate the operations of the converter CV in the states, as described above. FIGS. 7(a) to 7(k) correspond to FIGS. 5(a) to 5(k), respectively, and explanation thereof in detail will be omitted here.

The power converter control system of the first embodiment offers the following beneficial advantages.

1) The converter CV has the capacitor Cs connected in parallel to the main switch M1, the primary coil T1 of the transformer T and the sub-switch S1 which are connected in parallel to the capacitor Cs, the secondary coil T2 of the transformer T and the sub-inductor Ls connected in parallel to the main diode Dm2, and the sub-inductor Ls. This structure works to control a change in voltage developed in a circuit path across the main switch M1 with a change in voltage across the capacitor Cs when the main switch M1 is turned off, thereby resulting in a decrease in power loss in the converter CV. Additionally, when the main switch M1 is turned on, the current entering the main switch M1 is controlled or restricted by the sub-inductor Ls, thus resulting in a decrease in power loss.

2) The converter CV is equipped with the sub-diode Ds1, thereby avoiding the flow of current from the high-potential output terminal of the converter CV to the sub-switch S1 when turned on.

3) The converter CV is equipped with the sub-diode Ds2, thereby avoiding the application of voltage, as developed at the high-potential output terminal of the converter CV, to the main inductor Lm through the secondary coil. T2 of the transformer T.

4) The converter CV is equipped with the sub-diode Ds3, thereby avoiding the transfer of voltage across the capacitor Cs to the main switch M1.
5) The secondary coil T2 of the transformer T and the sub-inductor Ls are made by a common winding, thus facilitating the ease of downsizing magnetic parts of the converter CV.
6) The sub-switch S1 is turned on in a period of time for which the main switch M1 is in the off-state, thereby causing the current flowing through the main inductor Lm to be delivered from the main diode Dm2 to the sub-inductor Ls, which restricts the current flowing through the main switch M1 when turned on.
7) The length of time the sub-switch S1 is kept on is increased with an increase in value derived by dividing the amount of current flowing through the main inductor Lm by the output voltage of the converter CV (i.e., the voltage developed across the ends of the capacitor 18). This facilitates the ease with which the current flowing through the main diode Dm2 when the main switch M1 is turned on is decreased in a control mode of operation of the controller 20.

The converter control system of the second embodiment will be described below with reference to FIG. 8. The same reference numbers as employed in the first embodiment will refer to the same parts, and explanation thereof in detail will be omitted here.

When the current flowing through the main inductor Lm varies greatly, it is difficult for the structure of FIG. 1 to decrease the power loss occurring upon turning off of the main switch M1 to an allowable level. Specifically, a decrease in capacitance of the capacitor Cs results in an increase in rate at which the voltage charged in the capacitor Cs changes when the current flowing through the main inductor Lm is great, thus leading to an increase in rate at which the voltage developed across the ends of the main switch Ml rises when the main switch M1 is turned off. Conversely, an increase in capacitance of the capacitor Cs results in a difficulty in elevating the voltage across the capacitor Cs up to the output voltage of the converter CV when the current flowing through the main inductor Lm is small, thus leading to a failure in outputting the current from the converter CV. It is, thus, difficult or impossible for the capacitor Cs to have a capacitance suitable over an entire range in which the current flowing through the main inductor Lm changes greatly.

In order to alleviate the above problem, the converter CV of this embodiment is designed to change the capacitance in a circuit line extending in parallel to the main switch M1.

Specifically, the converter CV is equipped with a capacitor Cs1 and a series-connected assembly of a sub-switch Sc and a capacitor Cs2 coupled in series with each other. The capacitor Cs1 and the series-connected assembly are connected in parallel to each other and also coupled in parallel to the main switch M1 through the sub-diode Ds3. When it is required to have a greater capacitance in the circuit line extending parallel to the main switch M1, the controller 20 (not shown in FIG. 8), turns on the sub-switch Sc to connect the capacitors Cs1 and Cs2 to the main switch M1 to make a combination of the capacitors Cs1 and Cs2 work as a single capacitor. Alternatively, when it is required to have a smaller capacitance in the circuit line extending parallel to the main switch M1, the controller 20 turns off or opens the sub-switch Sc to disconnect the capacitor Cs2 from the main switch Ml to make only the capacitor Cs1 work as a capacitor. The combination of the capacitor Cs1 and Cs2 may, therefore, be said to serve as a single capacitor whose capacitance is variable.

Figure 9:
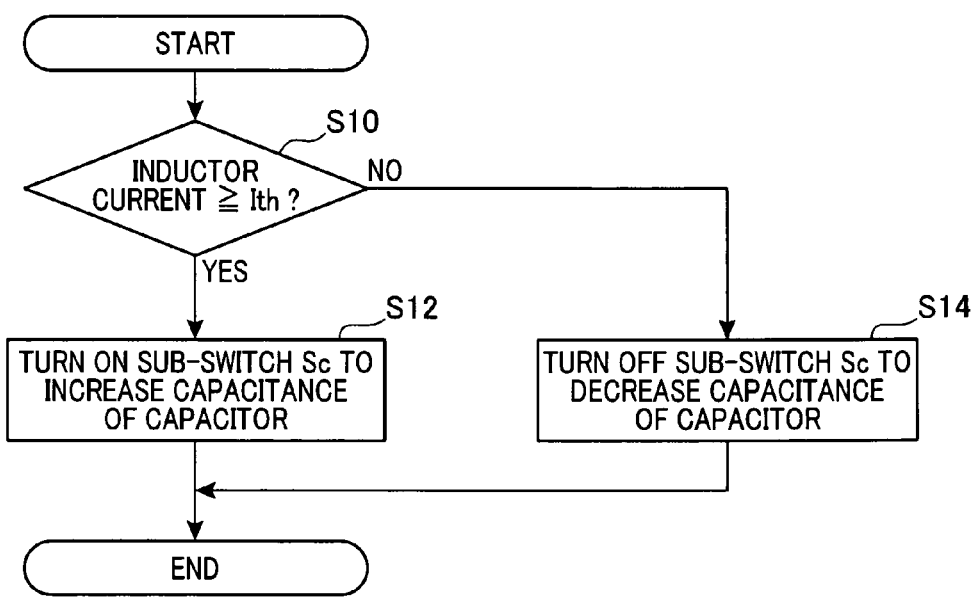
FIG. 9 is a flowchart of a program to be executed to change a total capacitance of capacitors in the power converter of FIG. 8.

FIG. 9 is a flowchart of a sequence of logical steps or program to be executed by the controller 20 to change a total capacitance in the circuit line extending parallel to the main switch M1 (i.e., an available capacitance of a combination of the capacitors Cs1 and Cs2) as a function of the amount of electric current flowing through the main inductor Lm. The program is to be executed at a regular interval.

After entering the program, the routine proceeds to step S10 wherein it is determined whether the electric current flowing through the main inductor Lm is greater than or equal to a given threshold value Ith or not. This determination is made for determining whether the total capacitance of the capacitors Cs1 and Cs2 is required to be changed or not. The threshold value Ith is so selected that the current which flows through the main inductor Lm and is greater than or equal to the threshold value Ith is sufficient to charge the capacitors Cs1 and Cs2 to elevate the voltage, as developed across them, up to the output voltage of the converter CV within a period of time shorter than the off-time of the main switch M1.

If a YES answer is obtained in step S10, then the routine proceeds to step S12 wherein the sub-switch Sc is turned on to increase the total capacitance in the circuit line extending parallel to the main switch M1. Alternatively, if a NO answer is obtained, then the routine proceeds to step S14 wherein the sub-switch Sc is turned off to decrease the total capacitance in the circuit line extending parallel to the main switch M1.

After step S12 or S14, the routine terminates.

The power converter control system of the second embodiment offers an additional beneficial advantage below in addition to the advantages 1) to 7).

8) The converter CV is designed to have the capacitor which is connected in parallel to the main switch M1 and whose capacitance is variable. Specifically, when the current flowing through the main inductor Lm changes greatly, the controller 20 works to change the total capacitance of the capacitors Cs1 and Cs2, thus optimally controlling the speed at which the voltage across the ends (i.e., the collector and the emitter) of the main switch Ml increases when the main switch M1 is turned off.

The converter control system of the third embodiment will be described below with reference to FIG. 10 which is a modification of the first embodiment. The same reference numbers as employed in FIG. 1 will refer to the same parts, and explanation thereof in detail will be omitted here.

The converter CV is designed to have the sub-circuit, as used in the first embodiment, installed in a step-down chopper circuit. Specifically, the step-down chopper circuit has a series-connected assembly of the main switch M2 and the main diode Dm1 which is coupled parallel to the high-voltage battery 14 and the capacitor 18. The step-down chopper circuit also has the capacitor 16 connected to a joint of the main switch M2 and the main diode Dm1 through the main inductor Lm. The main diode Dm2 is also connected in inverse-parallel to the main switch M2.

The sub-circuit has the sub-diodes Ds2 and Ds3 connected at cathodes thereof to a joint of the main switch M2 and the main diode Dm1. The sub-circuit also has the sub-diode Ds1 coupled at a cathode thereof to the sub-switch S1.

The controller 20 turns on or off the main switch M2 to step-down the voltage, as produced by the high-voltage battery 14, and output it to the capacitor 16. The rate at which the voltage across the main switch M2 rises when the main switch M2 is turned off is restricted by the rate at which the voltage charged in the capacitor Cs rises. The transfer of current flowing through the main diode Dm1 to the sub-inductor Ls and the transformer T is achieved by turning on the sub-switch S1 during the on-state of the main switch M2. The rate at which the current flowing through the main switch M2 increases gradually when the main switch M2 is turned on is, therefore, restricted by the inductance of the sub-inductor Ls.

The converter control system of the fourth embodiment will be described below with reference to FIG. 11. The same reference numbers as employed in FIG. 1 will refer to the same parts, and explanation thereof in detail will be omitted here.

The converter CV is designed to have two sub-circuits installed in a bi-directional step-up chopper circuit. The bi-directional step-up chopper circuit is made up of two structures one of which is the same as that of the step-up chopper circuit of the first embodiment and other of which is the same as that of the step-down chopper circuit of the third embodiment. The sub-circuits are provided one for each of the main switches M1 and M2.

When it is required to step-up the current to be outputted from the high-voltage battery 14 to the capacitor 18, a lower circuitry (i.e., a lower one of the sub-circuits) of the bi-directional step-up circuit, as viewed in the drawing, which is equipped with the capacitor Cs connected in parallel to the main switch M1 is activated. Alternatively, when it is required to step-down the current to be delivered from the capacitor 18 to the high-voltage battery 14, an upper circuitry (i.e., an upper one of the sub-circuits) of the bi-directional step-up circuit, as viewed in the drawing, which is equipped with the capacitor Cs connected in parallel to the main switch M2 is activated.

The converter control system of the fifth embodiment will be described below with reference to FIG. 12. The same reference numbers as employed in FIG. 1 will refer to the same parts, and explanation thereof in detail will be omitted here.

The converter CV is designed to have a sub-circuit installed in an inverting step-up/down chopper circuit.

Specifically, the inverting step-up/down chopper circuit has a series-connected assembly of the main switch M1 and the main diode Dm2 which is coupled between the positive terminal of the high-voltage battery 14 and the capacitor 18. The inverting step-up/down chopper circuit also includes the main inductor Lm connecting between a joint of the main switch M1 and the main diode Dm2 and the negative terminal of the high-voltage battery 14. The main diode Dm1 is also coupled in inverse-parallel to the main switch M1.

The sub-circuit has the sub-diodes Ds2 and Ds3 connected at cathodes thereof to a joint of the main switch Ml and the main diode Dm2. The sub-circuit also has the sub-diode Ds1 coupled to have the forward direction from the capacitor 18 to the sub-switch S1.

The rate at which the voltage across the main switch Ml rises when the main switch M1 is turned off is restricted by the rate at which the voltage charged in the capacitor Cs rises. The transfer of current flowing through the main diode Dm2 to the sub-inductor Ls is achieved by turning on the sub-switch S1 within a period of time in which the main switch Ml is placed in the off-state. The rate at which the current flowing through the main switch M1 increases gradually when the main switch Ml is turned on is, therefore, restricted by the inductance of the sub-inductor Ls.

Figure 13:
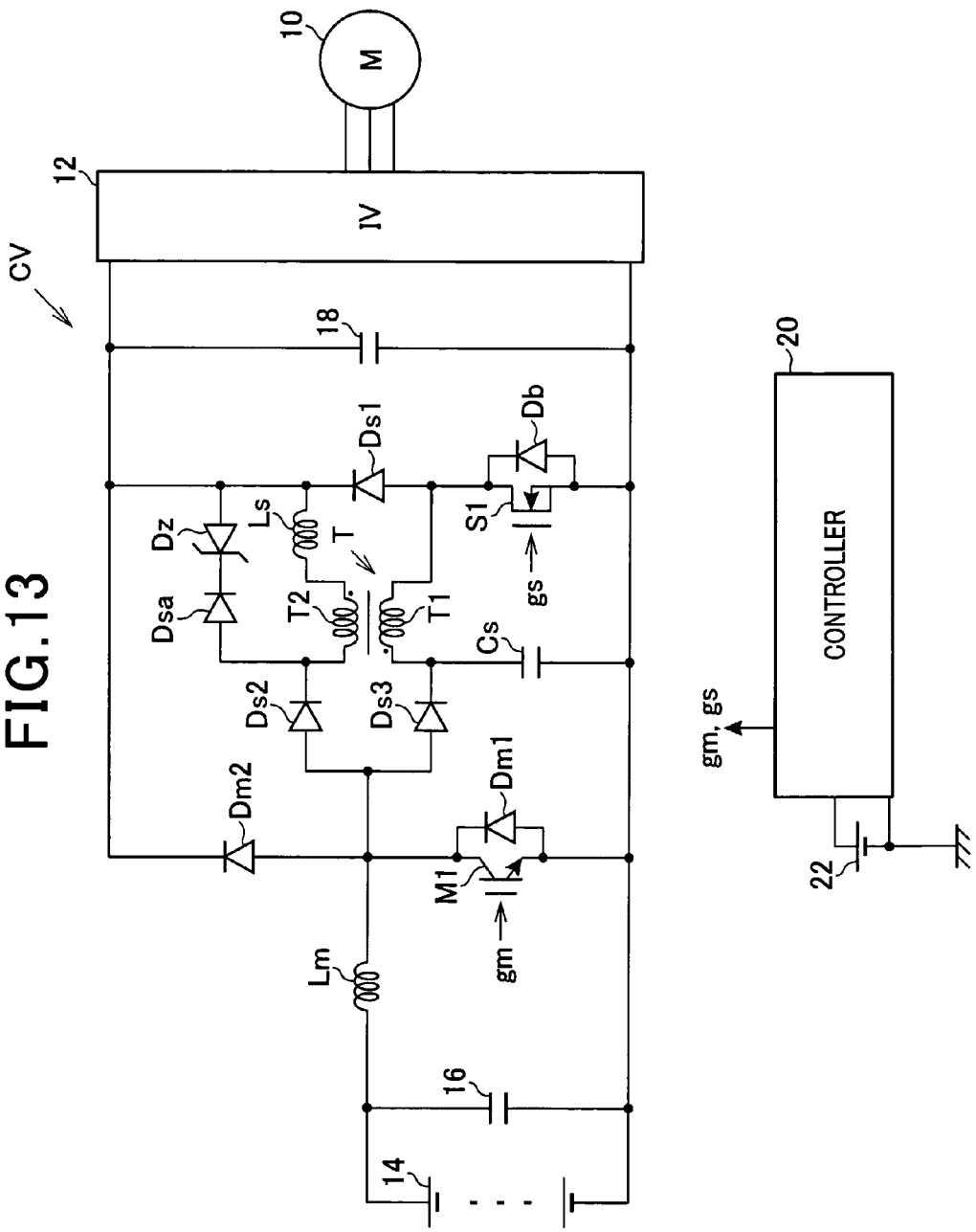
FIG. 13 is a circuit diagram which illustrates a converter control system for a power converter according to the sixth embodiment of the invention.

The converter control system of the sixth embodiment will be described below with reference to FIG. 13. The same reference numbers as employed in FIG. 1 will refer to the same parts, and explanation thereof in detail will be omitted here.

The converter CV is designed to have a circulating path which is connected in parallel to the secondary coil T2 of the transformer T and the sub-inductor Ls and in which the diode Dsa and the Zener diode Dz are disposed. The diode Dsa is oriented to have the forward direction in which the electric current is allowed to flow from a low-potential side to a high-potential side. The Zener diode Dz is oriented to have the forward direction opposite that of the diode Dsa.

The circulating path is to suppress the surge voltage arising from the accumulation of recovery current to pass through the sub-diode Ds2 in the sub-inductor Ls. Specifically, at an initial state of the seventh operating state where the current which has flowed through the sub-inductor Ls in the sixth operating state in FIG. 4(b) becomes zero, the recovery current usually flows through the sub-diode Ds2. In general, the recovery current increases gradually and then decreases gradually. During such a gradual increase, the voltage which is positive at the side of the positive terminal of the capacitor 18 will, thus, be applied to the sub-inductor Ls, so that the potential at the cathode of the sub-diode Ds2 is not increased. Conversely, during the gradual decrease in the recovery current, the voltage which is negative at the side of the positive terminal of the capacitor 18 will be induced in the sub-inductor Ls, so that the potential at the cathode of the sub-diode Ds2 rises greatly.

The voltage induced at the sub-inductor Ls during the gradual decrease in the recovery current is, however, suppressed by leading the electric current through the diode Dsa in the forward direction, resulting in suppression of the surge voltage.

The diode Dsa is provided to prevent the current which flows through the sub-diodes Ds2, the secondary coil T2, and the sub-inductor Ls or the current which is to flow through the sub-diode Ds1 from passing through the circulating path in the fourth operating state of FIG. 3(d), the fifth operating state of FIG. 4(a), or the sixth operating state of FIG. 4(b). This causes electrical energy which is outputted from the high-voltage battery 14 or accumulated in the capacitor Cs to be delivered to the capacitor 18 without being consumed as thermal energy in the circulating path.

The Zener diode Dz is provided to prevent the current which arises from the voltage induced at the secondary coil T2 by the voltage applied to the primary coil T1 from passing through the circulating path in the the sixth operating state of FIG. 6(d). This causes electric energy which is accumulated in the capacitor Cs to be delivered to the capacitor 18 without being consumed as thermal energy in the circulating path.

The breakdown voltage of the Zener diode Dz is selected to be greater than the value of N2·Vout/N1 where N1 is the number of turns of the primary coil T1, N2 is the number of turns of the secondary coil T2, and Vout is the output voltage of the converter CV (i.e., the voltage across the capacitor 18). This is because the voltage to be applied to the primary coil T1 in the sixth operating state of FIG. 6(d) is lower than the output voltage Vout, so that the voltage, as induced at the secondary coil T2, will be less than or equal to N2·Vout/N1.

The Zener diode Dz serves to clamp the surge voltage, as occurring during the gradual decrease in the recovery current flowing through the sub-diode Ds2, to the breakdown voltage of the Zener diode Dz.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

How to Change Capacitance of Capacitor

Figure 8:
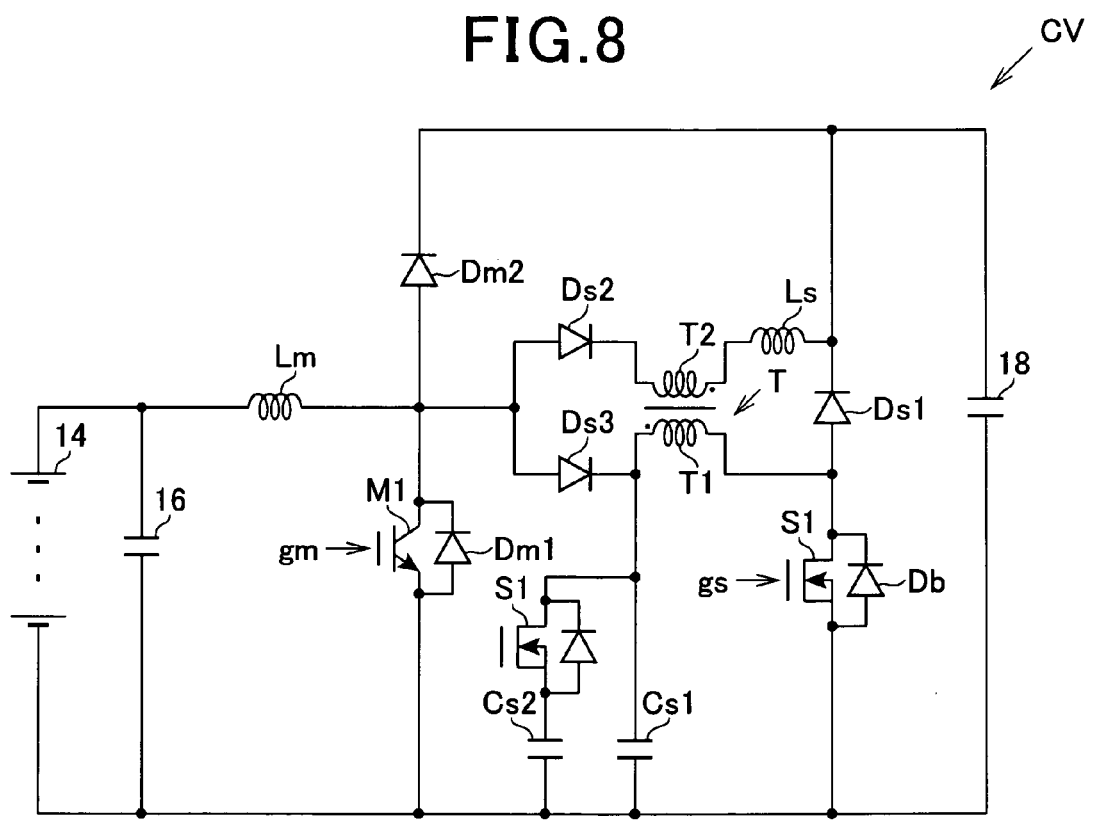
FIG. 8 is a circuit diagram which illustrates a converter control system for a power converter according to the second embodiment of the invention.

The structure of the converter CV of FIG. 8 has the two capacitors Cs1 and Cs2 to change the capacitance in the circuit line extending in parallel to the main switch M1. The capacitors Cs1 and Cs2 are connected in parallel to each other, but may alternatively be joined in series. The converter CV may be designed to have three or more capacitors to change the capacitance in the circuit line extending in parallel to the main switch M1 finely.

First Sub-Current Flow Controlling Component

The sub-diode Ds1 works as a first sub-current flow controlling component which is connected between one of the ends of the primary coil T1 of the transformer T which is farther away from the main inductor Lm and one of the ends of the secondary coil T2 which is farther away from the main inductor Lm. Instead of the sub-diode Ds1, a thyristor may be used. The controller 20 turns on the thyristor in each of the sixth to eighth operating states, as described above.

Second Sub-Current Flow Controlling Component

The sub-diode Ds2 works as a second sub-current flow controlling component to allow the electric current which is to pass through the secondary coil T2 to flow from the low-potential side to the high-potential side, but to block the current in the opposite direction. The sub-diode Ds2 may alternatively be installed between the joint of the sub-inductor Ls and the sub-diode Ds1 and the sub-inductor Ls or between the sub-inductor Ls and the secondary coil T2 in the structure of FIG. 1.

Third Sub-Current Flow Controlling Component

The sub-diode Ds3 works as a third sub-current flow controlling component to allow the electric current which flows in a circuit line connecting between the main inductor Lm and the capacitor Cs to pass therethrough only when the main switch M1 is switched to the off-state. Instead of the sub-diode Ds3, another type of switching device such as a MOS-FET may be used In the case of the MOS field-effect transistor, the controller 20 turns off it when the current is to flow in the opposite direction.

The sub-diode Ds3 may be disposed at another location. For example, in the structure of the converter CV such as the one in FIG. 1 where the series-connected assembly of the primary coil T1 and the sub-switch S1 is connected at ends thereof to the ends of the capacitor Cs, the capacitor 16 is coupled to the main switch M1 without passing through the sub-diode Ds3, and the capacitor 18 is joined to the series-connected assembly of the main switch M1 and the main diode Dm2 without passing through the sub-diode Ds3, the sub-diode Ds3 may be installed anywhere in a looped line in which the main switch M1 and the capacitor Cs are disposed. FIG. 15(a) shows an example of a location of the sub-diode Ds3. The converter CV has, as can be seen from the drawing, the looped line extending through the main switch M1 and the capacitor Cs. The sub-diode Ds3 is disposed between a lower section of the looped line, as viewed in the drawing. The sub-switch S1 is preferably kept on until the capacitor Cs discharges fully. FIG. 15(b) shows the converter CV that is a modification of the one in FIG. 10. Specifically, the sub-diode Ds3 is installed in an upper section of the looped path, as viewed in the drawing, extending through the main switch M2 and the capacitor Cs. FIG. 15(c) shows the converter CV that is a modification of the one in FIG. 12. Specifically, the sub-diode Ds3 is installed in a left-hand side of the looped path extending through the main switch M1 and the capacitor Cs.

On-Time of Sub-Switch

The on-time which the sub-switch (e.g., the switch S1) is kept on is determined in proportion to the value derived by dividing the amount of current flowing through the main inductor Lm by the output voltage of the converter CV, but however, may alternatively be set to a fixed value.

Time When Main Switch is to be Turned On

The main switch Ml is to be turned on after the electric current flowing through the main diode Dm2 becomes zero, but may alternatively be on when at least a portion of the current flowing through the main diode Dm2 is being transferred to the transformer T. This also results in a decrease in power loss upon turning on of the main switch M1 as compare with when the current flowing through the main diode Dm2 is not transferred to the transformer T.

Transformer and Sub-Inductor

The ratio of the number of turns of wire wound around the core 30, as illustrated in FIG. 2, to that wound around the core 32 may be changed. The secondary coil T2 and the sub-inductor Ls may also be made of discrete windings.

The secondary coil T2 and the sub-inductor Ls may be coupled together in the manner different from the one in the above embodiments. For instance, in the structure of FIG. 1, the sub-inductor Ls may be disposed between the sub-diode Ds2 and the secondary coil T2.

The transformer T needs not necessarily be engineered to have the optimum structure. For instance, the transformer T may be so made as to have an inductor connected in series to the secondary coil T2 in an equivalent circuit. This eliminates the need for the sub-inductor Ls.

Figure 14A:
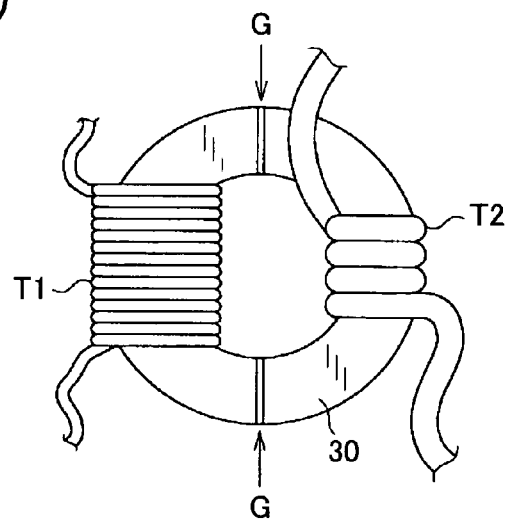
FIGS. 14(a), 14(b), and 14(c) are plane views which illustrate modifications of a transformer.
Figure 14B:
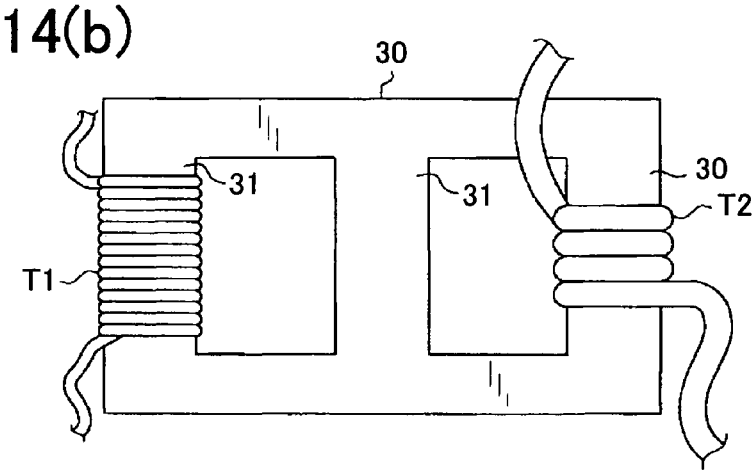
Figure 14C:
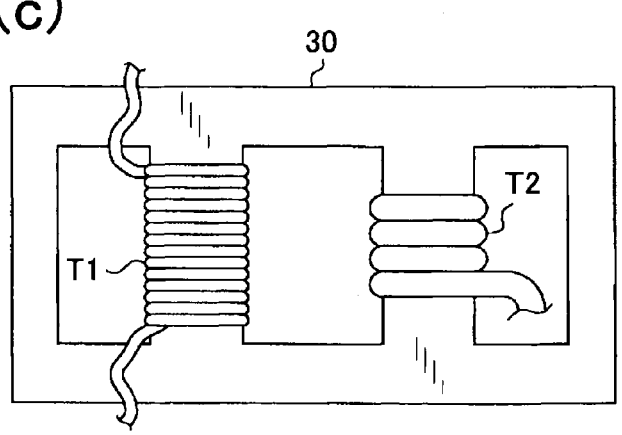

FIGS. 14(a) to 14(c) illustrate examples of the above modified transformer T. FIG. 14(a) shows the core 30 designed as a toroidal core in which the magnetic flux interlinks with both the primary coil T1 and the secondary coil T2. The core 30 is made of two half pieces which face each other through a gap G. The gap G may be defined by interposing material lower in magnetic permeability than the core 30 between halves of the core 30. This structure permits the transformer T to be made easily by winding the primary coil T1 and the secondary coil T2 around the half pieces of the core 30, respectively, and then joining the half pieces together. The gap G weakens the magnetic connection between the primary coil T1 and the secondary coil T2, thus resulting in an increase in leakage flux. The secondary leakage flux (i.e., the magnetic flux which does not interlink with the primary coil T1) works as an inductor instead of the sub-inductor Ls.

FIG. 14(b) shows the core 30 designed as an EE core with three legs 31. The primary coil T1 and the secondary coil T2 are wound around outside two of the legs 31 so that the magnetic flux interlinks with both the primary coil T1 and the secondary coil T2. The core 30 has a first magnetic loop path in which the magnetic flux interlinks with both the primary coil T1 and the secondary coil T2, a second magnetic loop path in which the magnetic flux interlinks only with the primary coil T1, and a third magnetic loop path in which the magnetic flux interlinks only with the secondary coil T2. The core 30 may have a gap, like in FIG. 14(a). The third magnetic loop path functions as an inductor instead of the sub-inductor Ls.

FIG. 14(c) shows the core 30 which has, like in FIG. 14(b), a first magnetic loop path in which the magnetic flux interlinks with both the primary coil T1 and the secondary coil T2, a second magnetic loop path in which the magnetic flux interlinks only with the primary coil T1, and a third magnetic loop path in which the magnetic flux interlinks only with the secondary coil T2. The second and third magnetic loop paths are partially located on both sides of the first magnetic loop path. Portions of the core 30 located outside the primary coil T1 and the secondary coil T2, thus, serve as magnetic shields to minimize adverse effects of magnetic noise, as made by the transformer T, on other parts.

Circulating Path

The circulating path needs not necessarily be joined parallel to the secondary coil T2. For instance, in the case where the sub-diode Ds2 is disposed between the secondary coil T2 and the sub-inductor Ls in the structure of FIG. 1, the circulating path is preferably coupled in series with the secondary coil T2 and in parallel to the sub-inductor Ls.

Figure 10:
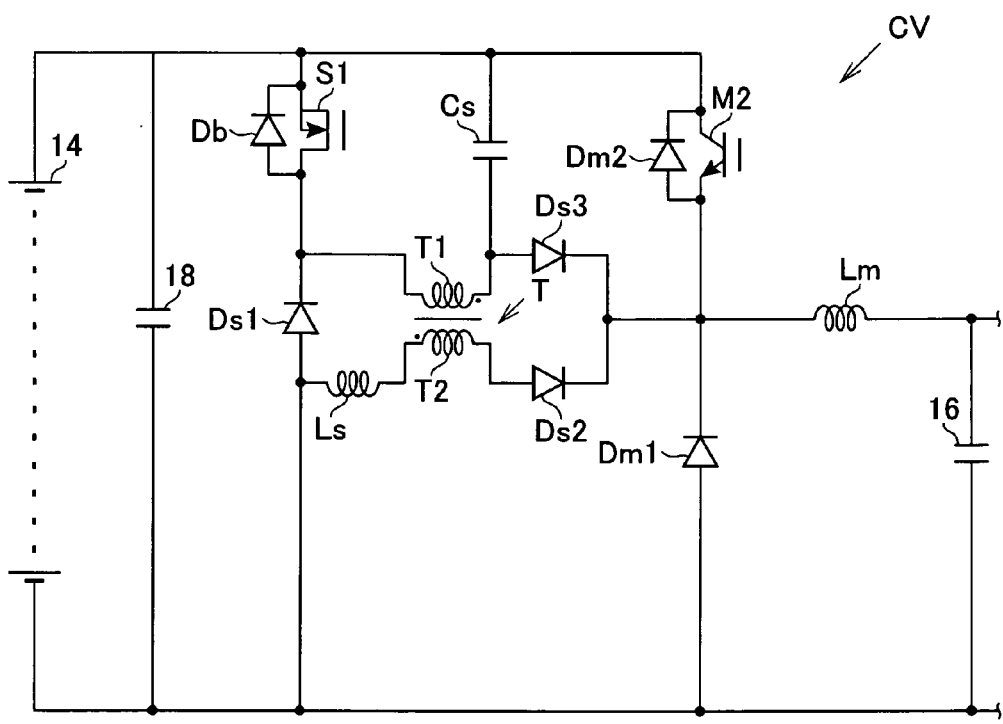
FIG. 10 is a circuit diagram which illustrates a converter control system for a power converter according to the third embodiment of the invention.
Figure 11:
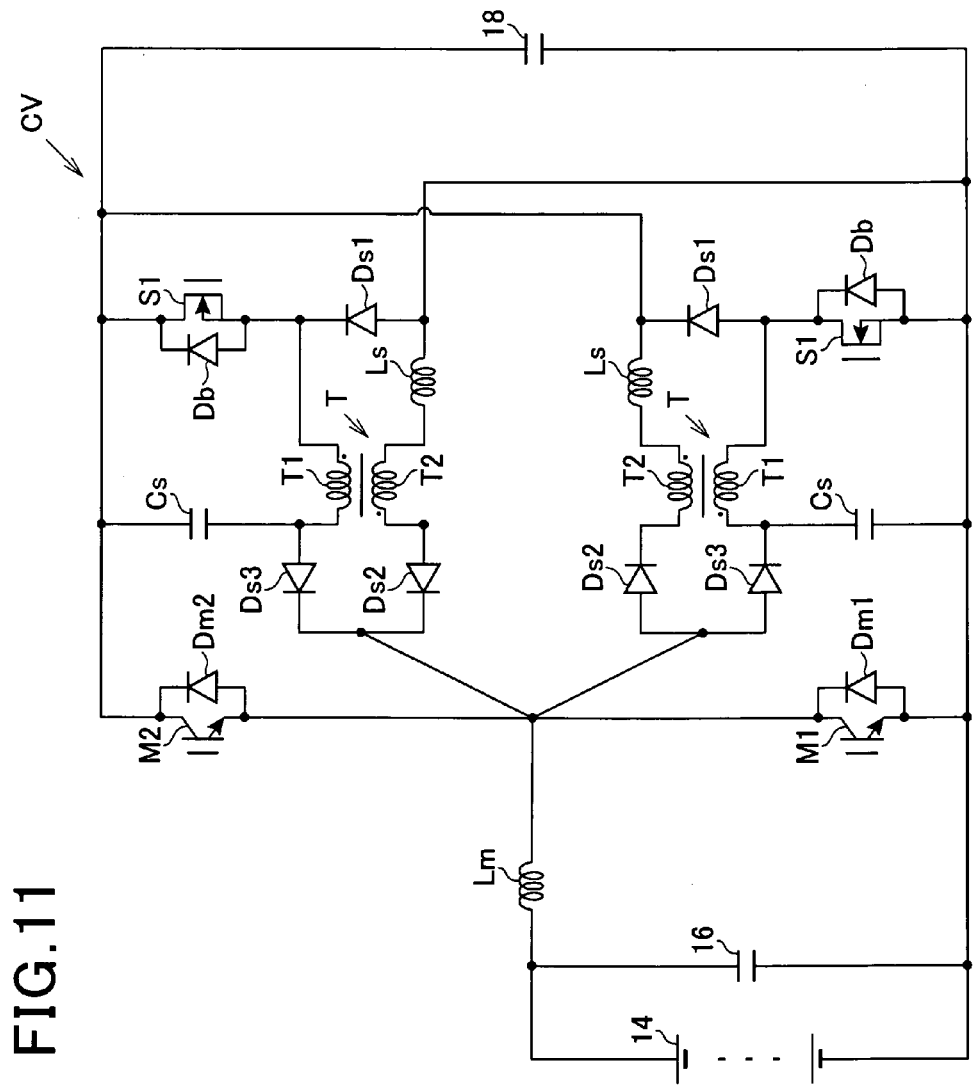
FIG. 11 is a circuit diagram which illustrates a converter control system for a power converter according to the fourth embodiment of the invention.
Figure 12:
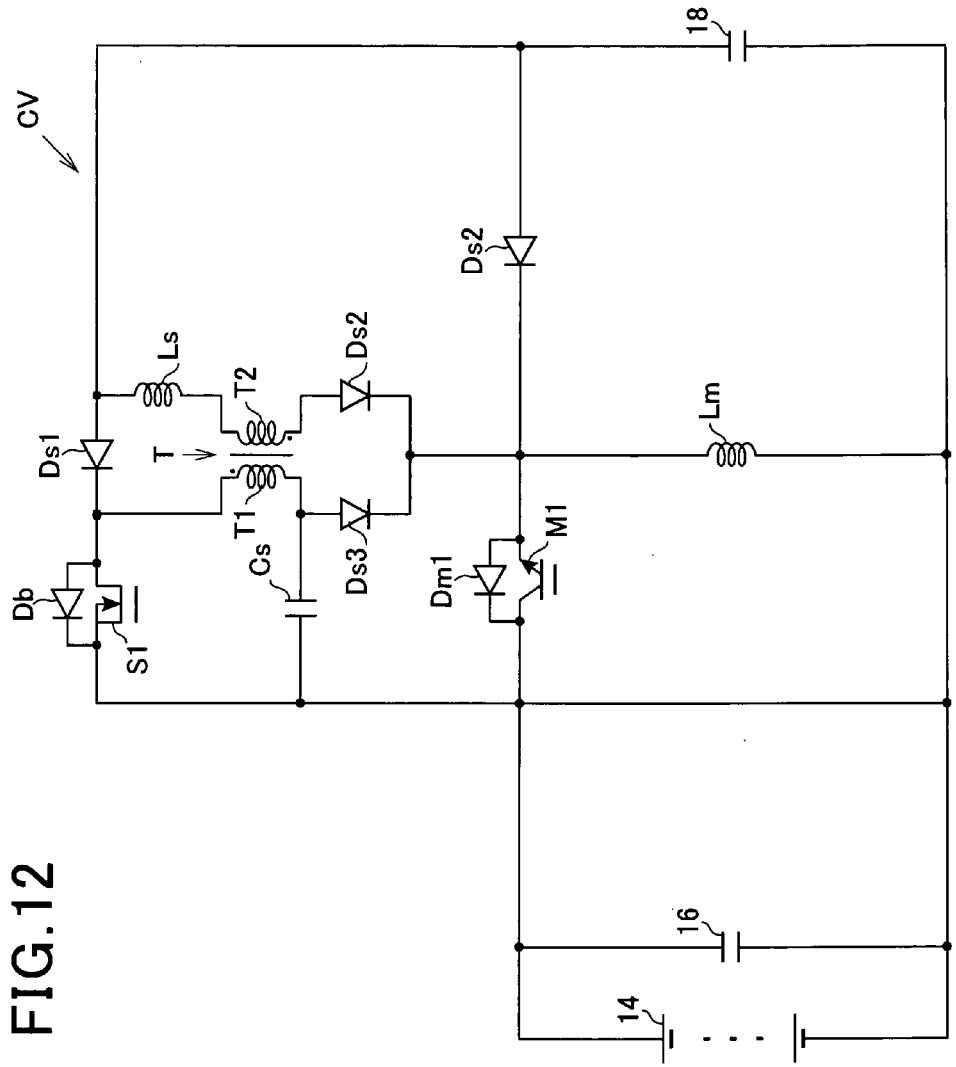
FIG. 12 is a circuit diagram which illustrates a converter control system for a power converter according to the fifth embodiment of the invention.

The circulating path may also be connected parallel to the secondary coil T2 and the sub-inductor in the structure of each of FIGS. 10 to 12.

Zener Diode Dz

The Zener diode Dz may be omitted if a loss of energy arising from flow through the circulating path can be ignored in the sixth operating state, as illustrated in FIG. 6(d).

Power Conversion Inductor

In the case where the power converter CV is equipped with an inverter and a sub-circuit of this invention is applied to reduce a power loss arising from turning on or off of switching devices of the inverter, a parasitic inductor in an electric motor driven by the inverter may be used instead of the power conversion inductor Lm.

First Current Flow Controlling Component

Either one of the main switches M1 and M2 works as a first current flow controlling component to perform an open/close function to open or close an electric current flow path and may be implemented by a MOS field-effect transistor as well as an IGBT. For instance, in the structure of FIG. 10 or 11, the main switch M2 works as the first current flow controlling component alone or in combination with the diode Dm2. The first current flow controlling component may be designed to include or not include a diode (i.e., the diode Dm1 or Dm2).

Second Current Flow Controlling Component

The main diode Dm2 basically works as a second current flow controlling component to perform a rectifying function. The second current flow controlling component may alternatively be designed as a switching device to perform only the open/close function. For instance, in the structure of FIG. 11, the main switch M2 may serve as the second current flow controlling component alone to perform the open/close function. The main switch M2 may alternatively work as the second current flow controlling component in combination with the diode Dm2 to perform both the open/close function and the rectifying function. The second current flow controlling component may be made of a power MOSFET as well as an IGBT. In the case of the power MOSFET, its parasite diode works to perform the rectifying function.

Sub-Switch

The sub-switch S1 or Sc works as a sub-current flow controlling component and may be implemented by an IGBT as well as a MOS field-effect transistor.

Power Converter

The structure, as described in each of the embodiments, may be employed in an DC-AC converter (i.e., an inverter) as well as a DC-DC converter.

The converter CV, as described above, is used to transmit the power between the motor generator 10 and the high-voltage battery 14, but may alternatively be disposed between an electric motor mounted in an automotive electrically-assisted power steering device and the battery 14 or employed for an uninterruptible power source installed in, for example, buildings.

What is claimed is:

1. A power converter apparatus comprising:
a converter circuit with a high-potential terminal and a low-potential terminal;
a first current flow controlling component which performs an open/close function to selectively open and close a current flow path of the converter circuit;
a second current flow controlling component which is connected in series with the first current flow controlling component as a series-connected assembly, the second current flow controlling component performing at least one of an open/close function and a rectifying function, the open/close function being to selectively open and close the current flow path, the rectifying function being to permit an electrical current to flow in only one direction;
a power conversion inductor connected to a joint of the first current flow controlling component and the second current flow controlling component;
a capacitor connected in parallel to the first current flow controlling component;
a transformer equipped with a primary coil and a secondary coil, the secondary coil being connected at a first end thereof to the power conversion inductor and in parallel to the second current flow controlling component;
a sub-switch connected in series with the primary coil and the series connection of the sub-switch and the primary coil being connected in parallel to the capacitor;
a first sub-current flow controlling component disposed in a first path of the converter circuit extending between a first end of the sub-switch through which the sub-switch is connected to the primary coil and a second end of the secondary coil which is opposed to the first end of the secondary coil, the first sub-current flow controlling component working to allow electric current to pass only from a low-potential side to a high-potential side in the first path;
a second sub-current flow controlling component working to allow electric current to pass only from a low-potential side to a high-potential side in a second path of the converter circuit which has the secondary coil disposed therein and bypasses the second current flow controlling component; and
a third sub-current flow controlling component working to allow electric current to flow in a third path of the converter circuit which extends between the power conversion inductor and the capacitor only in a direction in which, when the first current flow controlling component is opened, electric current will flow in the third path.

2. A power converter apparatus as set forth in claim 1, wherein the capacitor is designed to have a variable capacitance.

3. A power converter apparatus as set forth in claim 1, wherein the second path of the converter circuit also has a sub-inductor disposed therein.

4. A power converter apparatus as set forth in claim 3, wherein the sub-inductor and the secondary coil are at least partially made of a common winding.

5. A power converter apparatus as set forth in claim 4, wherein the transformer includes a core shaped to have a first magnetic loop path in which a magnetic flux interlinks with both the primary coil and the secondary coil, a second magnetic loop path in which a magnetic flux interlinks only with the primary coil, and a third magnetic loop path in which a magnetic flux interlinks only with the secondary coil.

6. A power converter apparatus as set forth in claim 1, further comprising a controller which turns on the sub-switch when the first current flow controlling component is opened.

7. A power converter apparatus as set forth in claim 1, wherein an on-time for which the sub-switch is kept on is increased with an increase in value derived by dividing an amount of current flowing through the power conversion inductor by a voltage, as developed across the series-connected assembly of the first current flow controlling component and the second current flow controlling component.

8. A power converter apparatus as set forth in claim 1, wherein the second sub-current flow controlling component is a diode, and further comprising a circulating path which provides an alternative path to the second path of the converter circuit except the second sub-current flow controlling component and has disposed therein a rectifier working to allow electric current to pass only from a low -potential side to a high-potential side in the circulating path.

9. A power converter apparatus as set forth in claim 8, wherein the circulating path also has disposed therein a Zener diode whose forward direction is a direction in which electric current flows from the high-potential side to the low-potential side.

* * * * *